United States Patent [19]
Olson

[11] Patent Number: 6,065,800
[45] Date of Patent: May 23, 2000

[54] TRUCK AERODYNAMIC A-PILLAR DESIGN

[75] Inventor: M. Eugene Olson, Fort Wayne, Ind.

[73] Assignee: Navistar International Transportation Corp, Chicago, Ill.

[21] Appl. No.: 09/293,511

[22] Filed: Apr. 15, 1999

Related U.S. Application Data

[60] Provisional application No. 60/121,190, Feb. 23, 1999.

[51] Int. Cl.[7] .................................................. B62D 33/06
[52] U.S. Cl. .................................. 296/190.08; 296/96.21; 296/201
[58] Field of Search ............................. 296/84.1, 96.21, 296/201, 190.01, 190.08, 190.1

[56] References Cited

U.S. PATENT DOCUMENTS

| | | | |
|---|---|---|---|
| 1,439,919 | 12/1922 | Snell | 296/201 |
| 3,114,571 | 12/1963 | Carson et al. | 296/84.1 |
| 5,056,850 | 10/1991 | Katcherian et al. | 296/93 |

*Primary Examiner*—Dennis H. Pedder
*Attorney, Agent, or Firm*—Jeffrey P. Calfa; Dennis K. Sullivan

[57] ABSTRACT

An aerodynamic windshield to door frame interface on a mobile ground vehicle, such as a medium or heavy duty highway truck. More specifically, the interface including the windshield and front door frame, sometimes referred to as the "A" pillar, contains a third order mathematical ellipse when viewed from the top of the vehicle. The inclusion of the third order ellipse in the "A" pillar and in some cases the outer edge of the windshield moves the rear point of tangency further back along the vehicle cab.

13 Claims, 5 Drawing Sheets

TRUCK AERODYNAMIC A-PILLAR DESIGN

RELATED APPLICATIONS

This application claims the benefit of U.S. Provisional Application No. 60/121,190, filed Feb. 23, 1999 which application is incorporated herein in its entirety.

BACKGROUND OF THE INVENTION

This invention relates to an aerodynamic windshield to door frame interface on a mobile ground vehicle, such as a medium or heavy duty highway truck. More specifically, the interface including the windshield and front door frame, sometimes referred to as the "A" pillar, contains a third order mathematical ellipse when viewed from the top of the vehicle. The inclusion of the third order ellipse in the "A" pillar and in some cases the outer edge of the windshield moves the rear point of tangency further back along the vehicle cab.

PRIOR ART

There is no previous known work in applying an elliptical shape to the curved interface of a vehicle windshield to "A" pillar of the vehicle. Tests of the invention design described here have shown significant reductions in air flow resistance around the front of windshields using such an elliptical windshield to "A" pillar interface. When combined with aerodynamic tractor to trailer packages, there are significant savings in vehicle fuel mileage. Hence, there is a need for a vehicle with an aerodynamic windshield to front door frame interface with an elliptical shaped "A" pillar when viewed from above.

SUMMARY OF INVENTION

The primary object of the invention of improved aerodynamics from a highway truck windshield to door frame or "A" pillar interface is accomplished by use of an elliptical, continuously smooth, decreasing curvature shape or mathematical third order ellipse in the plan form view of the interface. The third order ellipse may be blended with a portion of a circular arc to accommodate shorter vehicle cabs. Additionally, the third order ellipse at the interface may be blended with a curved or flat windshield on the vehicle. The primary function of the aerodynamic 'A' pillar design is to allow airflow on the windshield (in a planform view) to change flow direction from an outward flow direction, approximately 90 degrees to the free stream flow direction, to parallel flow with the free stream airflow direction and the cab door in an aerodynamically efficient manner. The invention eliminates or at a minimum significantly reduces flow separations caused by sharp corners, drip edges, windshield periphery seals, door junction gaps, and glass offsets. The end result is improved aerodynamic and fuel consumption efficiency for most tractor/trailer and truck applications.

DESCRIPTION OF THE DRAWINGS

While the invention is particularly pointed out and distinctly claimed in the concluding portions, two embodiments are set forth in the following detailed description which may be best understood when read in connection with the accompanying drawings, of which:

DESCRIPTION OF A PREFERRED EMBODIMENT OF THE INVENTION

Figure 1:
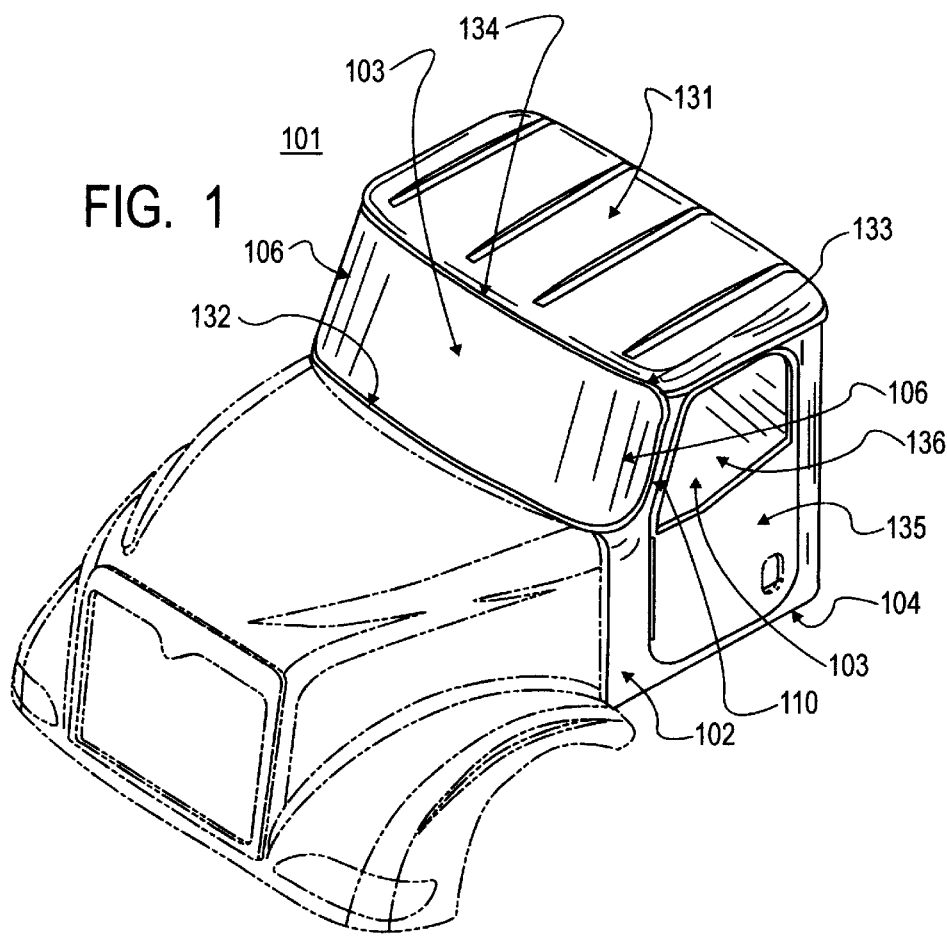
FIG. 1 is a perspective view of a vehicle with a curved windshield and aerodynamic windshield to door frame interface made in accordance with this invention.
Figure 2:
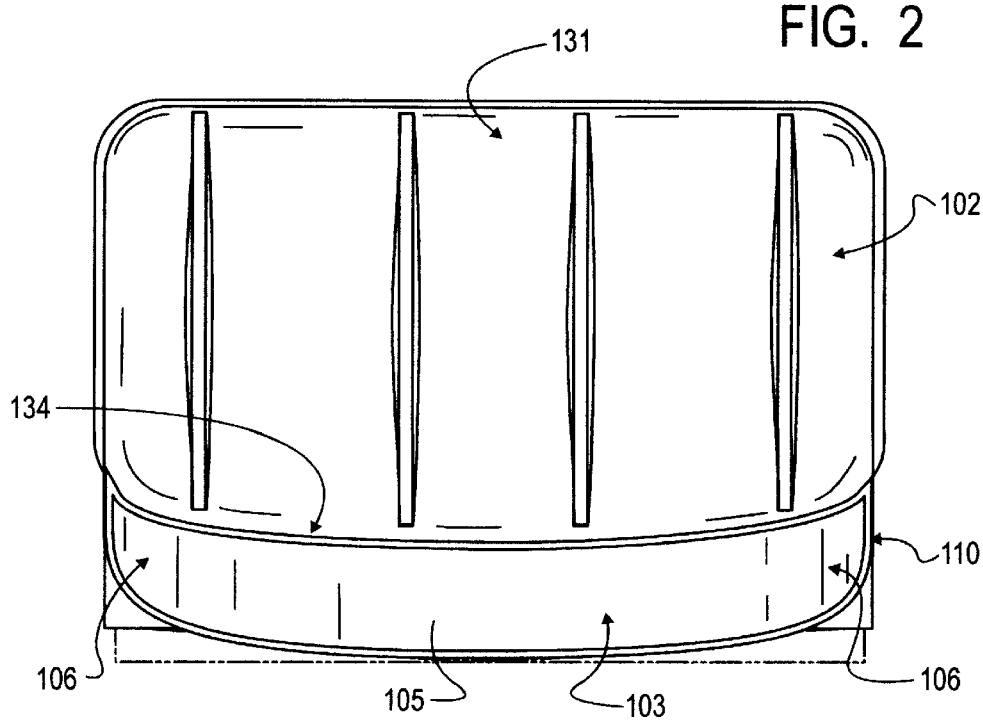
FIG. 2 is a top down view of the cab of the vehicle shown in FIG. 1.

FIGS. 1 and 2 show a drivers cab 102 for a mobile ground vehicle 101, such as a highway truck, for which a windshield 103 to door frame 104 interface made in accordance with this invention may be applied. The cab 102 is engaged to a chassis of the vehicle 101 which may be driven on the ground. The cab 102 has a roof 131 on top, door frames 104 on the sides, and a cowl 132 for the lower forward area. The windshield 103 is installed in an open windshield frame 133. The windshield frame 133 is defined by a front edge 134 of the roof 131, an upper portion of the cowl 132, and front door frame 'A' pillars 110 of the door frames 104 for the sides of the windshield frame 133.

The windshield 103 shown has a center area 105 that is shown curved but may also be straight. The curvature of the center area 105 is described by various size sweeps. A one (1) sweep indicates that over a sixty (60) inch length the maximum displacement of the arc of the curve from a straight line is one (1) eighth (1/8) inches. A two (2) sweep has a displacement of the arc of the curve of two (2) eighths over a sixty (60) inch length. The embodiments of the invention shown in FIGS. 3 to 6 are twenty (20) and twenty eight (28) sweeps, respectively, with the 28 sweep of FIG. 6 being preferred because the larger the sweep the easier to blend the defined shapes of the A-pillar 110. The windshield 103 shown also has two curved corners 106 although these are not required in all embodiments. The curved corners 106 each interface with a front door frame 'A' pillar 110 of the door frame 104 for each side of the cab 102. The upper front section 110 is also known as an "A" pillar 110 for short. The principle innovation of this invention involves the geometry of the curved corners 106 of the windshield 103, the "A" pillar 110, and the interface there between when viewed from above. The interface in a planform view, or better put in a plane parallel to the ground, for a portion of the vertical length of the 'A' pillar 110 contains an elliptical, continuously smooth, decreasing curve 111 commencing in the windshield 103 and continuing with a gradually increasing radius curvature as the curved surface progresses around the "A" pillar 110 with a termination of the curve 111 on a side glass 134 of side door 135 of the cab 102. In the preferred embodiment the curve 111 includes a portion of a third order mathematical ellipse 111 when viewed from above. Four different embodiments of the invention are shown in FIGS. 3 to 6. The third order ellipse 111 may be included all within the curved corners 106 of the windshield 103, all within the "A" pillar 110, or blended between the curved corners 106 and the "A" pillar 110. The third order ellipse 111 may be blended with a portion of a second order curve or circular arc 123 in some cases where there are spacing constraints for the vehicle's manufacture.

For reference, the mathematical relationship defining the third order ellipse 111, when viewed from above, is defined in X and Y coordinates with X and Y being variables. The X direction is along an axis running from the front to the rear of the vehicle 101 while the Y direction is along an axis running across the vehicle 101 and perpendicular to the X direction. For each of the third order ellipse 111 embodiments 111m, 111n, 111p, and 111q, shown in FIGS. 3 to 6, there are three constants 'a', 'b', and 'c'. The four embodiments are shown in FIGS. 3 to 6 as seamless curves with the transition between the windshield 103 and the 'A' Pillar 110. Not shown in FIGS. 3 to 6, is that the transition is a smooth one without any roughness or upraised portion. The aerodynamic benefit is not achieved unless there is a smooth transition. Refer to FIGS. 1 and 2 for more details on how the windshield 103 transitions mechanically to the 'A' Pillar 110. The constants 'a' and 'b' define the general shape of the third order ellipse 111 (the height to width relationship) and are a function of and defined by several design constraints. These design constraints include cab 102 width, windshield 103 curvature (sweep), 'A' pillar 110 glass distortion tolerance, manufacturability, and door 135 side glass 136 definition. The constant 'c' is a scaling or size setting value. There is a zero-zero reference point, 112m, 112n, 112p, and 112q, for embodiment respectively, where both the X and Y variables are both zero. The mathematical relationship defining the third order ellipses 111 is in the form of:

$$\frac{X^3}{a^3} + \frac{Y^3}{b^3} = c^3$$

As mentioned above, constants 'a', 'b', and 'c' vary for different configurations or embodiments of this invention. The constants 'a' and 'b' are related by the proportions illustrated and 'c' is as defined previously. For the third order ellipse 111m shown in FIG. 3, the constant 'b' is one half (½) of the constant 'a'. There are curved corners 106 in the windshield 103 which for this embodiment include the third order ellipse 111m. The center area 105 of the windshield 103 is curved with a number 20 sweep. As described qualitatively below the curvature of the center area 105 assists in changing the direction of the air flow coming at the front of the vehicle 101 by approximately 90 degrees and hence reduces drag and improves fuel economy.

Figure 3:
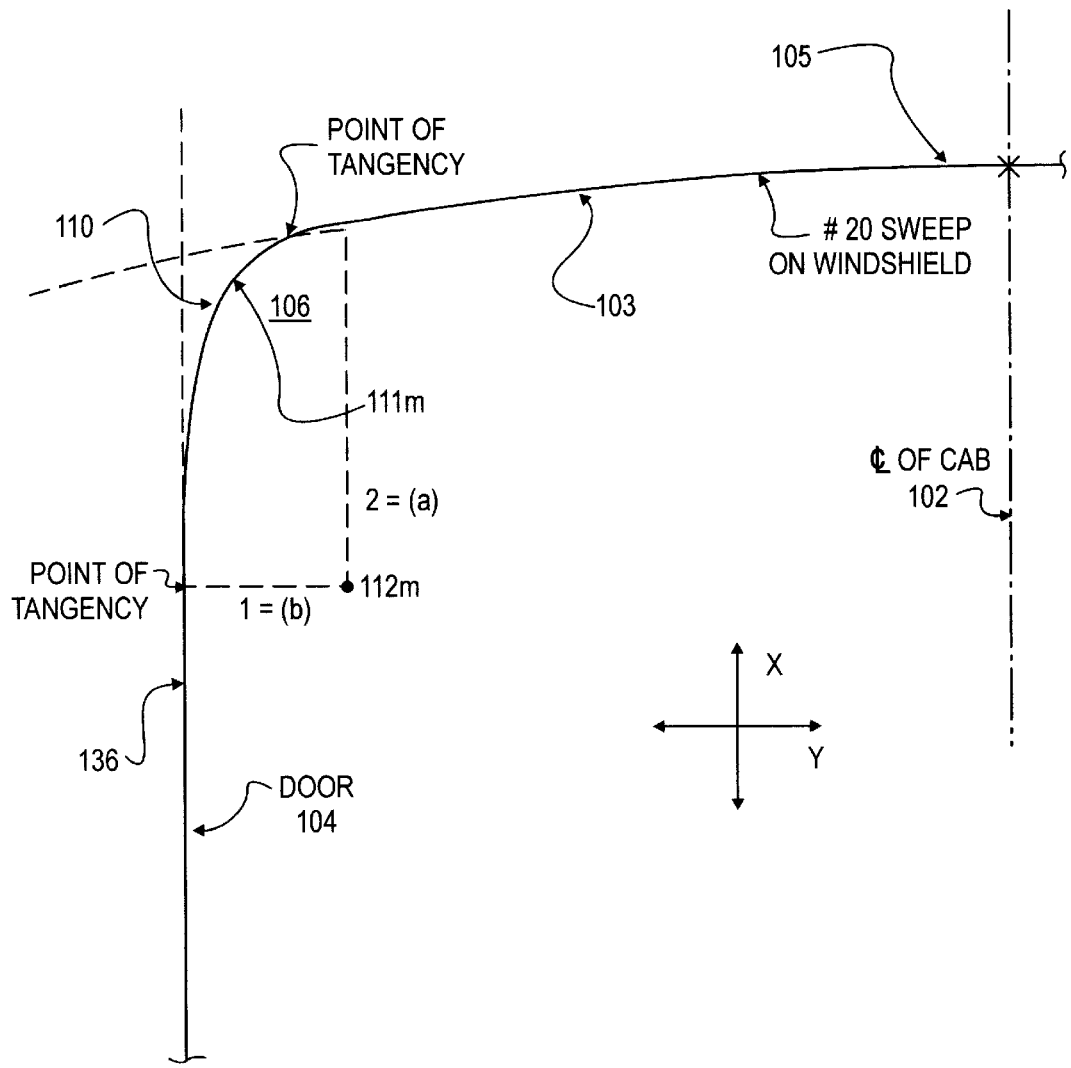
FIG. 3 is a partial planform view of one embodiment of the aerodynamic windshield to door frame interface of this invention for the vehicle shown in FIGS. 1 and 2.
Figure 5:
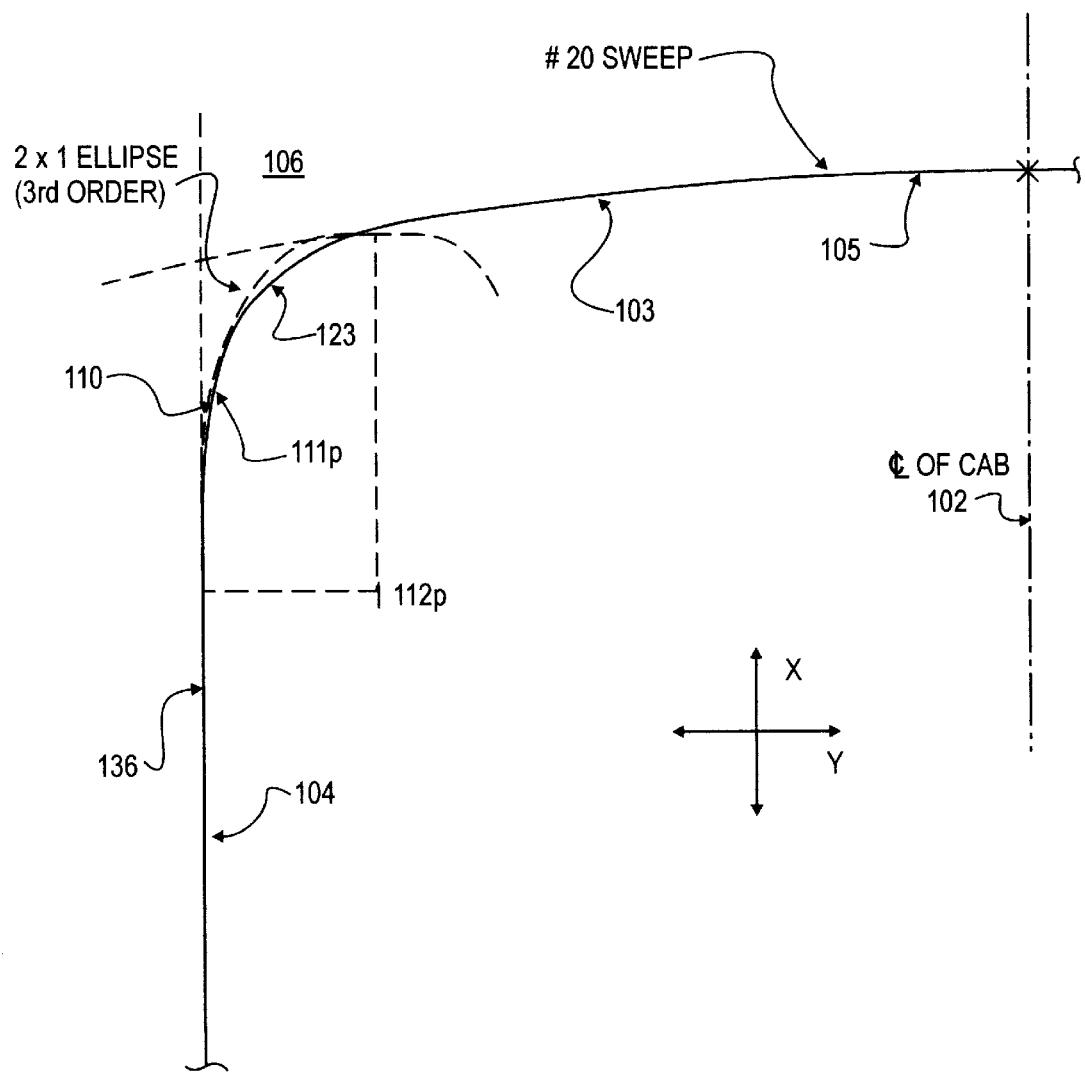
FIG. 5 is a partial planform view of a third embodiment of the windshield to door frame interface of this invention for the vehicle shown in FIGS. 1 and 2.

The third order ellipse 111p, shown in FIG. 5 has the same relationship of constants 'a', 'b', and 'c' and hence shape as the third order ellipse 111m of FIG. 3 with a second order curve 123 blending with the third order ellipse 111p. This blending is necessary for some applications where size constraints limit the X or lengthwise direction of the configuration.

Figure 4:
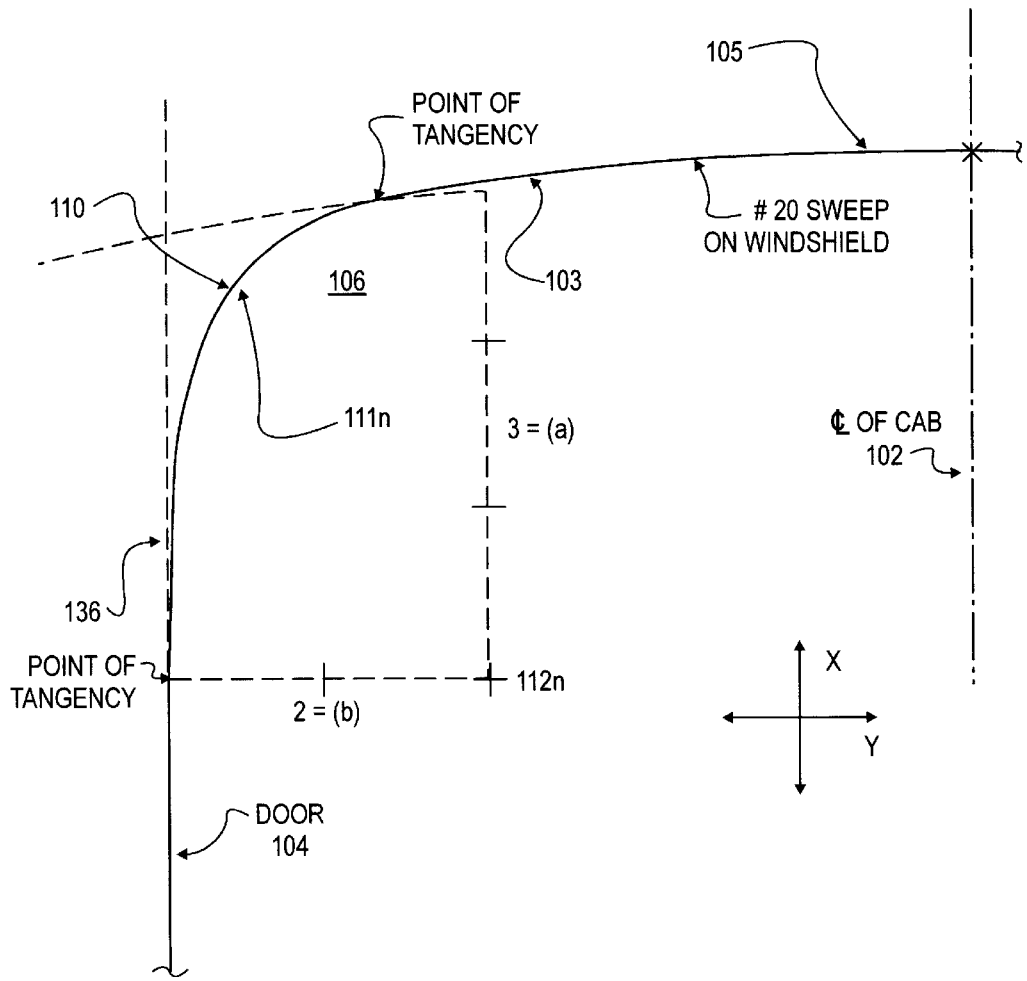
FIG. 4 is a partial planform view of a second embodiment of the windshield to door frame interface of this invention for the vehicle shown in FIGS. 1 and 2.

The third order ellipse 111n, shown in FIG. 4, has the constant relationship where the constant 'b' is two thirds (⅔) of the constant 'a'. The center area 105 of the windshield 103 for the FIG. 4 embodiment is curved as defined by a number 20 sweep and the windshield 103 has curved corners 106 interfacing with the 'A' pillar 110.

Figure 6:
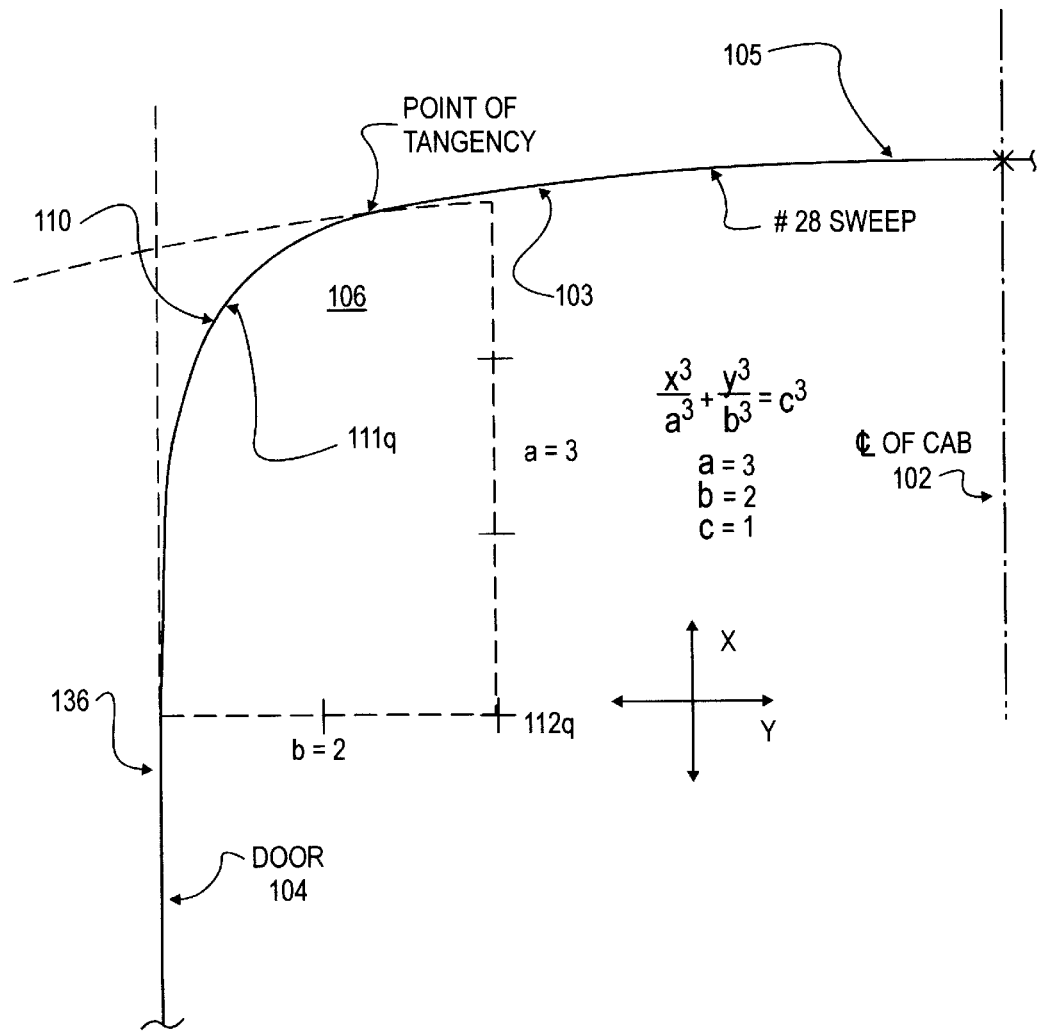
FIG. 6 is a partial planform view of a preferred and fourth embodiment of the windshield to door frame interface of this invention for the vehicle shown in FIGS. 1 and 2.

The third order ellipse 111q, shown in FIG. 6, has the same relationship of constants 'a', 'b', and 'c' and hence the shape as the third order ellipse 111n of FIG. 4. The difference from the FIG. 4 embodiment being that the center area 105 of the windshield 103 is curved as defined by a number 28 sweep. This FIG. 6 embodiment is the preferred embodiment of the invention. The 28 sweep leading into the third order ellipse with the constant relationship of 'b'=two thirds (⅔) of 'a' should provide an optimum performance improvement for the windshield 103 to 'A' pillar interface for a highway truck.

Wind tunnel tests on a scale model of an International® truck manufactured by Navistar International Transportation Corp. have shown improvements in vehicle drag or resistance to movement and hence improvements in expected fuel economy using the 'A' pillar windshield design and windshield slope changes. A model of the International® model 9200/9400, corresponding to the embodiment shown in FIG. 5, was shown to have improved drag resistance by approximately 2.75% which corresponds to a 1.2% improvement in fuel economy with an 'A' pillar design made in accordance with this invention. The windshield slope change associated with the 20 sweep additionally resulted in another approximately 1% drop in drag resistance corresponding to an expected 0.42% improvement in fuel economy. A model of the International® model 9900 had an improved drag resistance of approximately 1.6% corresponding to a 0.8% improvement in fuel economy due to the use of an 'A' pillar design made in accordance with this invention. The difference in results between the 9200/9400 and the 9900 scale models is related to a much larger separated flow region on top of the higher hood, the 9900 having a higher hood.

As described above, the aerodynamic windshield to door frame interface on a mobile ground vehicle of the present invention provide a number of advantages some of which have been described above and others of which are inherent in the invention. Also modifications may be proposed to the aerodynamic windshield to door frame interface on a mobile ground vehicle without departing from the teachings herein. Accordingly, the scope of the invention is only to be limited as necessitated by the accompanying claims.

We claim:

1. An aerodynamic mobile ground vehicle with a drivers cab having a roof and a cowl at a lower forward section, and the cab engaged to a chassis which may be driven on the ground, comprising:

(a) an open windshield frame in an upper forward portion of the cab;

(b) said windshield frame defined by a front edge of the roof of the cab, an upper portion of the cowl on a lower edge and front door frame 'A' pillars on sides of said windshield frame;

(c) a windshield with curved corners engaged into said windshield frame; and (d) said front door frame 'A' pillars having a portion of a third order ellipse on an exterior surface in a plane parallel to the ground for a portion of said front door frame 'A' pillar vertical length.

2. The aerodynamic vehicle of claim 1, wherein:

(a) said third order ellipse extends into said curved corners of said windshield.

3. The aerodynamic vehicle of claim 2, wherein:

(a) said third order ellipse is blended with a portion of a second order curve on each said curved corner of the windshield.

4. The aerodynamic vehicle of claim 2, wherein said third order ellipse is defined by an equation $$\frac{X^3}{a^3} + \frac{Y^3}{b^3} = c^3$$

and wherein (a) X and Y are variables referenced to a zero-zero reference points, with a zero-zero reference point for each curved corner of said windshield to front door frame 'A' pillar interface;

(b) said X direction is along an axis running from front to rear of the vehicle;

(c) said Y direction is along an axis running across the vehicle and perpendicular to said X direction;

(d) said zero-zero reference point is aft of said windshield relative to a lengthwise axis of the vehicle and inboard of said front door frame 'A' pillars relative to crosswise axis of said vehicle;

(b) said X and Y variables are both zero at said zero-zero reference points; and (c) 'a', 'b', and 'c' are constants.

5. The aerodynamic vehicle of claim 4, wherein:

(a) said constants 'a' and 'b' are related by the proportion that 'b' is one half constant 'a' and 'c' is the scaling or size setting constant.

6. The aerodynamic vehicle of claim 5, wherein:

(a) a center area of said windshield contains a number 20 sweep.

7. The aerodynamic vehicle of claim 4, wherein:

(a) said constants 'a' and 'b' are related by the proportion that 'b' is two thirds constant 'a' and 'c' is the scaling or size setting constant.

8. The aerodynamic vehicle of claim 7, wherein:

(a) a center area of said windshield contains a number 20 sweep.

9. The aerodynamic vehicle of claim 6, wherein:

(a) said third order ellipse is blended with a portion of a second order curve on each said curved corner of the windshield.

10. The aerodynamic vehicle of claim 7, wherein:

(a) a center area of said windshield contains a number 28 sweep.

11. An aerodynamic mobile ground vehicle with a cab engaged to a chassis which may be driven on the ground, the cab having a windshield interfaced with a front door frame 'A' pillar on each side of the windshield, comprising:

(a) a third order ellipse on an exterior surface of the windshield to front door frame 'A' pillar interface in a plane parallel to the ground.

12. An aerodynamic mobile ground vehicle with a cab engaged to a chassis that may be driven on the ground, said cab having a windshield interfaced with a front door frame 'A' pillar on each side of said windshield, and said cab having an elliptical, continuously smooth, decreasing curve in a plane parallel with the ground commencing in said windshield and continuing with a gradually increasing radius curvature as said curve progresses around said 'A' pillar with a termination of said curve at a tangency point on a side glass of a side door of the vehicle.

13. An aerodynamic mobile ground vehicle with a cab engaged to a chassis, said cab having a windshield interfaced with a front door frame 'A' pillar on each side of said windshield, said 'A' pillars each having an elliptical, continuously smooth, decreasing curve in a plane parallel with the ground and continuing with a gradually increasing radius curvature as said curve progresses around said 'A' pillar with a termination of said curve at a tangency point on a side glass of a side door of the vehicle.

* * * * *